(12) United States Patent
Hisshion et al.

(10) Patent No.: US 8,092,776 B2
(45) Date of Patent: Jan. 10, 2012

(54) PROCESS FOR THE RECOVERY OF SELENIUM FROM MINERALS AND/OR ACIDIC SOLUTIONS

(75) Inventors: Robert John Hisshion, Olongapo (PH); Rosauro C. Manalo, Rosario Cavite (PH)

(73) Assignee: Pacific Rare Specialty Metals and Chemicals, Inc., Rosario Cavite (PH)

( * ) Notice: Subject to any disclaimer, the term of this patent is extended or adjusted under 35 U.S.C. 154(b) by 0 days.

(21) Appl. No.: 12/855,880

(22) Filed: Aug. 13, 2010

(65) Prior Publication Data

US 2010/0329969 A1 Dec. 30, 2010

Related U.S. Application Data

(62) Division of application No. 12/494,081, filed on Jun. 29, 2009.

(51) Int. Cl.
*C01B 19/00* (2006.01)
*C01B 19/02* (2006.01)
(52) U.S. Cl. ......... 423/508; 423/510; 588/409; 588/414
(58) Field of Classification Search ............................ None
See application file for complete search history.

(56) References Cited

U.S. PATENT DOCUMENTS

| | | | |
|---|---|---|---|
| 2,039,256 A | 4/1936 | Martin et al. | |
| 2,076,738 A | 4/1937 | Martin et al. | |
| 2,835,558 A | 5/1958 | Vaaler | |
| 3,127,244 A * | 3/1964 | Elkin ............................ | 423/510 |
| 4,002,544 A | 1/1977 | Heimala et al. | |
| 4,106,939 A | 8/1978 | Chang et al. | |
| 4,163,046 A * | 7/1979 | Subramanian et al. ......... | 75/418 |
| 4,293,332 A | 10/1981 | Wang et al. | |
| 4,299,810 A | 11/1981 | Snow | |
| 4,374,758 A | 2/1983 | Sasaki et al. | |
| 4,615,731 A | 10/1986 | Thomas et al. | |
| 4,666,514 A | 5/1987 | Bertha | |
| 4,698,184 A | 10/1987 | Yu et al. | |
| 4,725,357 A | 2/1988 | Downing et al. | |
| 4,770,700 A | 9/1988 | Bertha et al. | |
| 5,147,572 A * | 9/1992 | Bush ............................... | 252/61 |
| 5,271,909 A | 12/1993 | Claessens et al. | |
| 5,286,463 A | 2/1994 | Schwartz, Jr. | |
| 5,939,042 A | 8/1999 | Stafiej et al. | |

(Continued)

FOREIGN PATENT DOCUMENTS

CN 1669913 A 9/2005

(Continued)

OTHER PUBLICATIONS

Victor Lenher, J. Livingston R. Morgan, "The Specific Gravity and Electrical Resistance of Metallic Tellurium", J. Am. Chem. Soc., 1900, 22 (1), 28-31 DOI 10.1021/ja02039a008, publication date (web): May 1, 2002.

(Continued)

*Primary Examiner* — Melvin Mayes
*Assistant Examiner* — Sheng H Davis
(74) *Attorney, Agent, or Firm* — Miles & Stockbridge P.C.; David R. Schaffer, Esq.; Michael A. Minter, Esq.

(57) ABSTRACT

A process and method for recovering elemental selenium, selenite or selenate from minerals and selenium salts solutions using a reducing sugar to reduce selenium before precipitating the elemental selenium, selenite and/or the selenate.

11 Claims, 2 Drawing Sheets

U.S. PATENT DOCUMENTS

| | | | |
|---|---|---|---|
| 6,090,290 | A | 7/2000 | Goodman et al. |
| 6,183,644 | B1 | 2/2001 | Adams et al. |
| 2005/0255017 | A1 | 11/2005 | Okada et al. |
| 2009/0191107 | A1* | 7/2009 | Meyer et al. .................... 423/22 |
| 2010/0326840 | A1 | 12/2010 | Hisshion et al. |
| 2010/0329968 | A1 | 12/2010 | Hisshion et al. |

FOREIGN PATENT DOCUMENTS

| | | | |
|---|---|---|---|
| CN | 192367 | * | 3/2007 |
| CN | 101417790 A | | 4/2009 |
| SU | 979516 A1 | | 12/1982 |

OTHER PUBLICATIONS

International Application No. PCT/ IB2010/001549—PCT International Search Report and PCT Written Opinion of the International Searching Authority dated Mar. 14, 2011.

International Application No. PCT/ IB20101001548—PCT International Search Report and PCT Written Opinion of the International Searching Authority dated Apr. 27, 2011.

Emelina et al., "Redox interaction of selenium(VI) with glucose," Trudy Khimiko-Metallurgicheskogo Instituta, Akademiya Nauk Kazakhskoi SSR, 28, 45-9 Coden: TKMAZ; ISSN: 0516-0324, 1978, XP8129178 the whole document & Database CA [Online] Chemical Abstracts Service, Columbus, Ohio, US; Emelina, A.V., et al., "Redox interaction of selenium(VI) with glucose" retrieved from STN Database accession No. 90:170893 abstract.

Chen et al., "Selenium nanotube synthesized via a facile template-free hydrothermal method," Chemical Physics Letters, North-Holland, Amsterdam, NL, vol. 417, No. 1-3, Jan. 9, 2006, pp. 132-136, XP025012922, ISSN: 0009-2614 DOI: DOI: 10.1016/J. CPLETT. 2005.09.083 [retrieved on Sep. 1, 2006].

Lenher, V., "Preparation of metallic tellurium", Journal of the American Chemical Society, Apr. 1899, pp. 347-351, vol. 21, No. 4, XP002610563, DOI: 10.1021/ja02054a002.

* cited by examiner

PROCESS FOR THE RECOVERY OF SELENIUM FROM MINERALS AND/OR ACIDIC SOLUTIONS

CROSS-REFERENCE TO RELATED APPLICATIONS

This application is a division of application Ser. No. 12/494,081, filed Jun. 29, 2009.

FIELD OF THE INVENTION

The present invention relates to a process and method for separating and recovering precious metals from copper refinery anode slimes in general, and in particular to a process and method for recovering selenium from minerals and acidic solutions.

BRIEF DESCRIPTION OF THE DRAWINGS

The foregoing and other aspects, features, and advantages of the present invention will be better appreciated from the following description of the embodiments, considered with reference to the accompanying drawing, wherein.

DETAILED DESCRIPTION OF THE PREFERRED EMBODIMENTS

Copper refinery anode slimes, which are settled and accumulated at the bottom of the electrolytic copper refining cells, are made up of components of the anodes which are not soluble in the electrolyte. These components contain various amounts of copper, silver, gold, sulphur (sulfur), lead, arsenic, selenium, tellurium, nickel, silica, and other components. Copper present in the slimes occurs usually in the form of metallic copper sulphide, copper telluride or copper selenide. In the treatment of anode slimes, impurities, for example, but not limited to, copper and nickel are removed first and selenium and tellurium thereafter, using different recovery processes.

Figure 1:
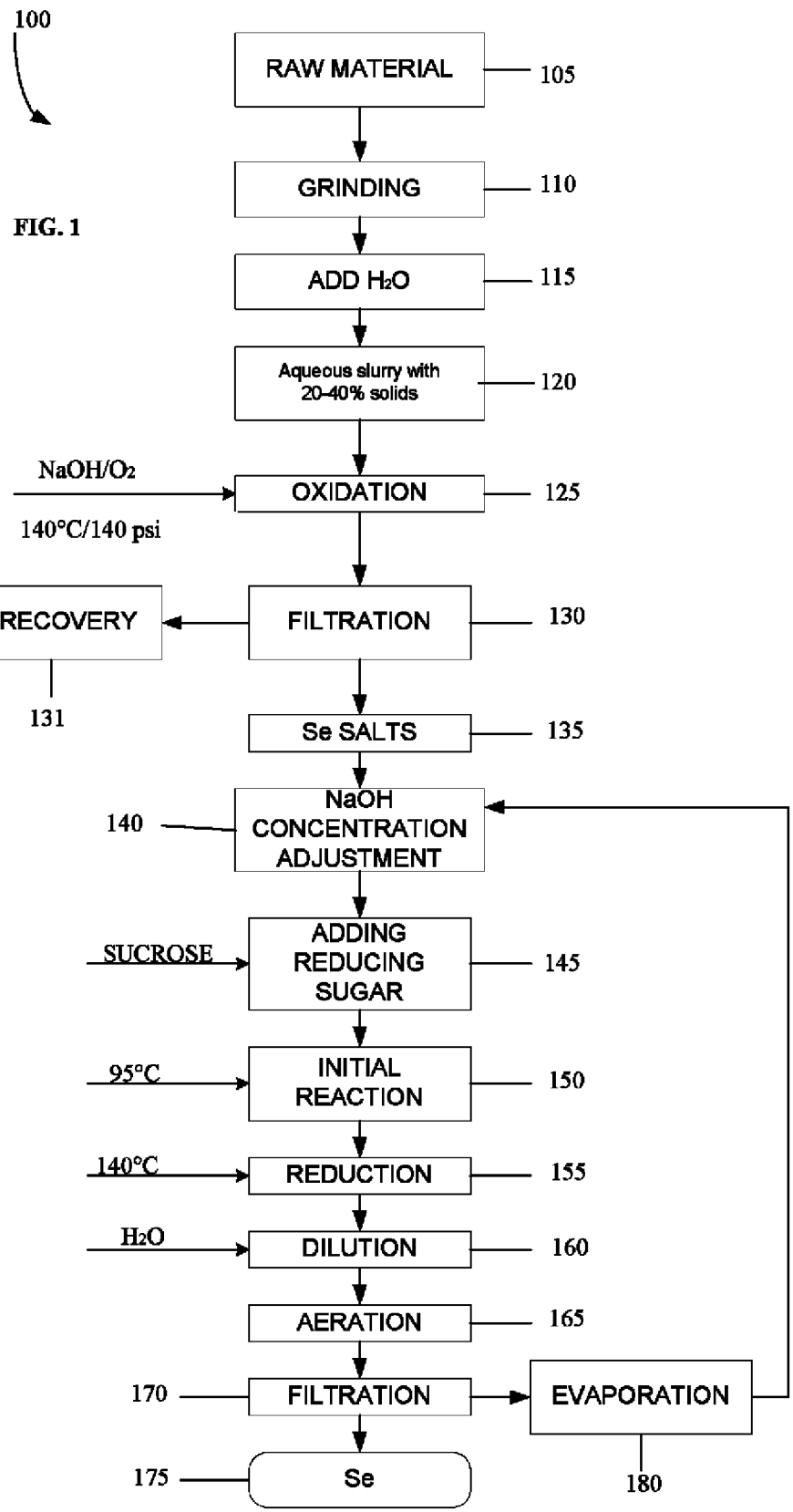
FIG. 1 is a drawing showing an outline of a process for separating selenium and tellurium from the material and from each other, and a process for precipitating and recovering selenium.

Whenever selenium and tellurium are present simultaneously in significant concentrations in the slime, it is important to provide a clean separation between these two elements before they are removed and recovered. It is also important to improve the recovery of these precious metals, to reduce the processing expense, and to use a process that is environmentally friendly. In the embodiment of FIG. 1, the process to recover selenium from a mineral includes, in general, the steps of: (i) leaching, where the precious metals are introduced to an aqueous environment, (ii) solvent extraction, where the metals are separated and purified, and (iii) reduction, where the metallic ions are reduced and precipitated from solutions. Reducing the metallic ions using reducing sugars or hydrolysis products of sugars, such as, sucrose, significantly reduces the overall processing expense.

Referring to FIG. 1 it is shown a hydrometallurgical process 100 for separating tellurium and selenium from a raw material feed 105 containing copper, tellurium, selenium, as well as other metals and impurities. The raw material feed 105 is first finely ground 110 and then mixed with an aqueous solution 115, such as water, to obtain a slurry 120 containing about 20 to 40% solids. As part of an oxidation 125, an alkali medium is added to the slurry and its concentration adjusted to about 50-250 g/L. The amount of the alkali medium required varies with the composition of the treated material and the particular application. The alkali medium can be any alkali metal hydroxide, such as sodium, potassium or lithium hydroxide.

In FIG. 1, sodium hydroxide (NaOH) is used as the alkali hydroxide. The alkali hydroxide added to the slurry during the oxidation 125 dissolves certain materials from the solids present in the slurry (e.g., leaching). For example, selenium is soluble and will migrate into the alkali solution whereas tellurium remains in the solids, forming part of the undissolved leaching residue. The slurry is next heated in a pressure vessel while oxygen ($O_2$) is injected into the vessel to facilitate oxidation of tellurium to tellurate and oxidation of selenium to a selenium salt in an alkaline solution. The oxygen can be provided, for example, by commercial oxygen, however, air may also be used as the oxidation agent. Typically, the temperature and pressure in the pressure vessel are maintained at around 140 degrees Celsius and 140 psi, until oxidation 125 is complete. In the presence of copper, the alkali metal and oxygen, tellurium oxidizes to tellurate ($TeO_4^{2-}$, or $TeO_6^{6-}$) and selenium to a selenium salt.

The oxidized tellurium is insoluble and remains in the solids as part of the undissolved leaching residue, whereas the selenium, which migrated into the alkali hydroxide solution, remains in the alkali solution. Separation 130 of selenium salts 135 from the oxidized tellurium requires a solid/liquid separating process, for example, filtration 130. During filtration 130 the alkali hydroxide solution is separated from the undissolved leaching residue, which results in a clean separation between selenium and tellurium. Polytetrafluoroethylene filter cloths or any other filter material can be used to separate 130 the undissolved components from the dissolved components. Once separated, the elemental selenium and elemental tellurium are each recovered separately.

The recovery of the elemental selenium, selenite and/or selenate is next described. For the recovery 131 of the elemental tellurium see copending patent application Ser. No. 12/494,081, filed concurrently herewith, the details of which are hereby incorporated herein by reference in its entirety.

After oxidation 125 and filtration 130, the soluble selenium salts 135 are made alkaline with an alkali hydroxide solution by adjusting 140 the concentration of the alkaline solution to about 100-400 g/L. A reducing agent is added 145 to the alkaline solution to facilitate reduction of the selenium. Any of the available reducing sugars, sacharrides, or hydrolysis products of sugars, such as fructose, sucrose, polyhydroxy aldehydes and ketones can be used as the reducing agent, with sucrose being used in the embodiment of FIG. 1. The alkaline solution, which is, for example but not limited to, sodium hydroxide, is initially heated to a temperature of about 95 degrees Celsius to initiate 150 reduction of the selenium in the alkaline solution. The temperature of the alkaline solution is then increased to about 140 degrees Celsius, for example, to complete the reduction process 155 of the selenium. Under these conditions selenium is effectively reduced from $Se^{6+}$ to substantially $Se^{4+}$. Selenates and selenites can also be reduced during this process and the reduction can be aided by a small amount of additional selenate or elemental selenium. The solution can be diluted 160 in an aqueous solution, such as water, and allowed to cool down. The cooled alkaline solution containing the reduced selenium is then areated 165 to precipitate the elemental selenium. The precipitated elemental selenium is next separated from the alkaline solution, by, for example, filtration 170. Following filtration 170, elemental selenium is recovered 175 and the caustic solution is evaporated 180 to concentrate the alkali metal solution and recycled for use in adjusting 140 the concentration of alkaline solution containing the selenium salt in the next recovery operation.

Figure 2:
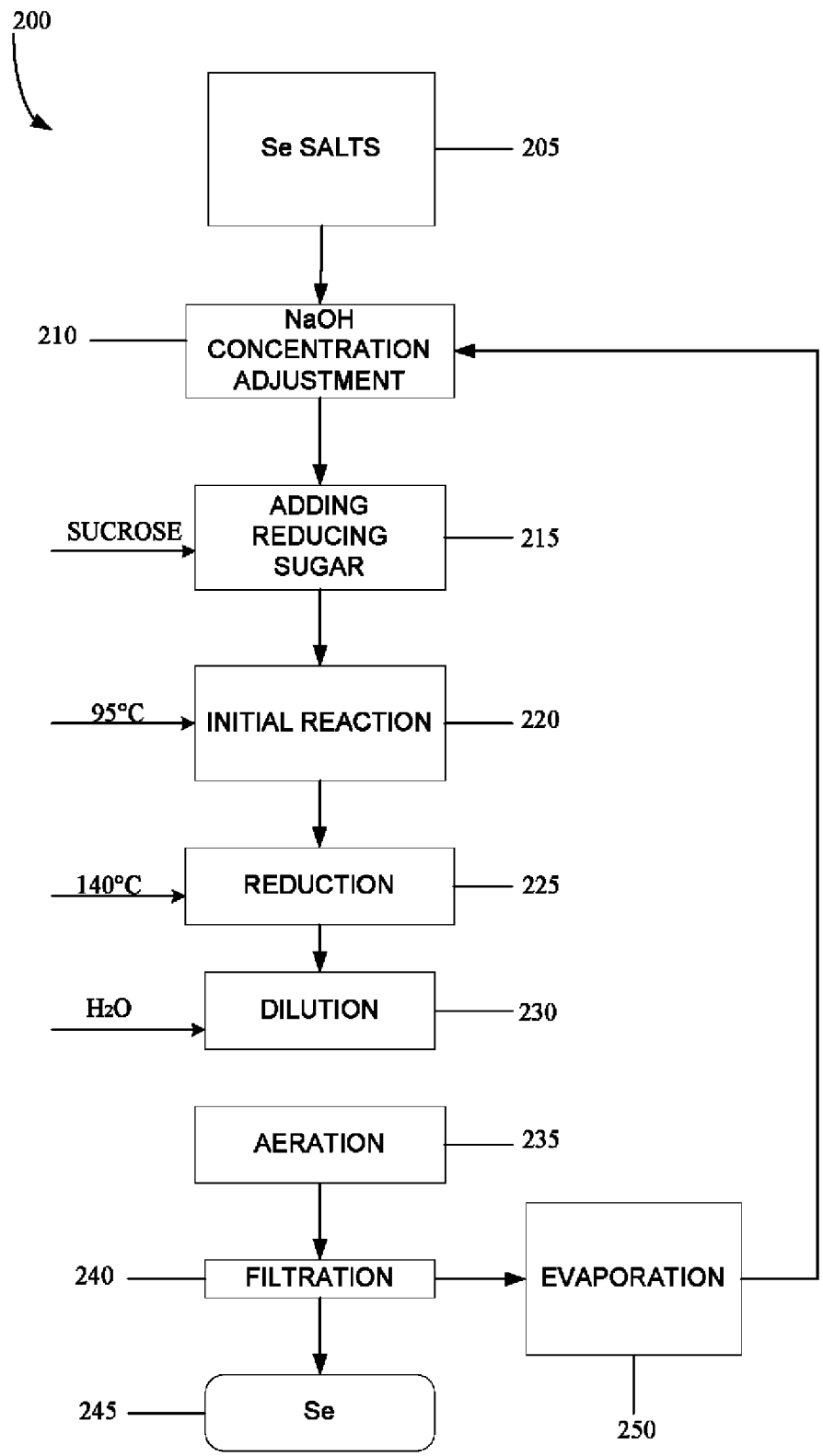
FIG. 2 is a drawing showing an outline of a process for recovering selenium from a material containing soluble Se salts.

In the embodiment of FIG. 2, it is shown a hydrometallurgical process 200 for recovering elemental selenium from a material containing soluble selenium salts 205. The soluble selenium salts 205 are made alkaline with an alkali hydroxide solution by adjusting 210 the concentration of the alkaline solution to about 100-400 g/L. A reducing agent is added 215 to the alkaline solution to facilitate reduction of the selenium. Any of the available reducing sugars, sacharrides, or hydrolysis products of sugars, such as fructose, sucrose, polyhydroxy aldehydes and ketones can be used as the reducing agent, with sucrose being used in the embodiment of FIG. 2. The alkaline solution, which is, for example but not limited to, sodium hydroxide, is initially heated to a temperature of about 95 degrees Celsius to initiate 220 reduction of the selenium in the alkaline solution. The temperature of the alkaline solution is then increased to about 140 degrees Celsius, for example, to complete the reduction process 225 of the selenium. Under these conditions selenium is effectively reduced from $Se^{6+}$ to substantially $Se^{4+}$. Selenates and selenites can also be reduced during this process and the reduction can be aided by a small amount of additional selenate or elemental selenium. The solution can be diluted 230 in an aqueous solution, such as water, and then allowed to cool down. The cooled alkaline solution containing the reduced selenium is then areated 235 to precipitate the elemental selenium. The precipitated elemental selenium is next separated from the alkaline solution, by, for example, filtration 240. Following filtration 240, elemental selenium is recovered 245 and the caustic solution is evaporated 250 to concentrate the alkali metal solution and recycle for use in adjusting 210 the concentration of alkaline solution containing the selenium salt in the next recovery operation.

Disclosed embodiments include (i.e., comprise) a process and method for recovering elemental selenium (Se) from a soluble selenium salt in an alkaline solution by first reducing selenium from $Se^{6+}$ to substantially $Se^{4+}$. To facilitate reduction of the selenium, a reducing agent is added to the solution before heating the solution to a predetermined temperature. The heating temperature of the solution is between 90-180 degrees Celsius. After reduction, the alkali solution is cooled, which results in the precipitation of the elemental selenium in the alkali solution. The reducing agent can be a reducing sugar, or a hydrolysis product of a sugar and the alkali solution can be an alkali hydroxide medium.

In an embodiment the reducing agent is sucrose.

In another embodiment the alkali solution is a sodium hydroxide solution with a concentration of between 100-400 g/L.

In another embodiment the alkali solution is diluted with water after cooling, and aeration is performed on the solution before precipitating. The solution can also be evaporated after selenium is recovered, in order to recycle the alkali metal for the next recovery batch.

Disclosed embodiments also include (i.e., comprise) a method for reducing selenium in an alkaline solution by first adjusting the concentration of the alkaline solution to be between 100-400 g/L, and then reducing the selenium in the alkaline solution by adding a reducing agent to the solution before heating the solution to a temperature of between 90-180 degrees Celsius. The reducing agent can be a reducing sugar or a hydrolysis product of a sugar.

In another embodiment, the hydrolysis product is sucrose.

Disclosed embodiments further include (i.e., comprise) a method for separating and recovering elemental selenium from a material containing tellurium and selenium. In this method the material is leached with an alkali solution causing selenium to migrate into the alkali solution. Tellurium and selenium are then oxidized by heating the leaching residue and the alkali solution to a predetermined first temperature of about 140 degrees Celsius until oxidation is complete. The leaching residue which includes the oxidized tellurium is then separated from the alkali solution which contains oxidized selenium (selenium salt). The selenium salt is made alkaline by adjusting the concentration of the alkali solution to be about 100-400 g/L. A reducing agent is added to the alkali solution and heated to a predetermined second temperature of about 90-180 degrees Celsius, effectively reducing selenium from $Se^{6+}$ to substantially $Se^{4+}$. After cooling, selenium is precipitated and filtered, and the caustic solution evaporated to concentrate and recycle the alkali metal for the next recovery process. Tellurium can be recovered from the leaching residue from the oxidation portion through a separate recovery process, which is the subject of copending patent application Ser. No. 12/494,081, filed concurrently herewith. The reducing agent can be a reducing sugar or a hydrolysis product of a sugar.

In an embodiment, the alkali solution is an alkali hydroxide solution.

In another embodiment, the alkali hydroxide solution is a sodium hydroxide solution.

In yet another embodiment, the reducing agent is sucrose.

It should be understood that the present invention is not limited to the embodiments described therein. Rather, those skilled in the art will appreciate that various changes and modification can be made in keeping with the principles exemplified by the illustrative embodiments.

What is claimed is:

1. A method for separating elemental selenium (Se) from a material containing tellurium and selenium, the method comprising:

leaching an aqueous slurry of the material with a first alkaline solution causing selenium to migrate into the first alkaline solution, while tellurium remains in a leaching residue;

oxidizing the tellurium and the selenium by heating a charge including the first alkaline solution and the leaching residue to a predetermined first temperature for a predetermined time to obtain oxidized tellurium and a selenium salt;

separating the leaching residue containing the oxidized tellurium from the first alkaline solution containing the selenium salt;

adjusting a concentration of the first alkaline solution containing the selenium salt by adding an alkali metal hydroxide to obtain a second alkaline solution, the second alkaline solution having a concentration of about 100-400 g/L;

reducing the selenium using a reducing agent before heating the second alkaline solution to a predetermined second temperature;

precipitating elemental selenium after cooling the second alkaline solution; and recovering the elemental selenium from the second alkaline solution.

2. The method as claimed in claim 1, wherein the first alkaline solution is an alkali hydroxide solution having a concentration of between 50-250 g/L.

3. The method as claimed in claim 2, wherein the alkali hydroxide solution is a sodium hydroxide solution.

4. The method as claimed in claim 1, wherein the first predetermined temperature is about 140 degrees Celsius, and the second predetermined temperature is between 90-180 degrees Celsius.

5. The method as claimed in claim 1, wherein the separating is by filtration.

6. The method as claimed in claim 1, wherein the reducing agent is a reducing sugar.

7. The method as claimed in claim 1, wherein the reducing agent is a hydrolysis product of a sugar.

8. The method as claimed in claim 7, wherein the hydrolysis product is sucrose.

9. The method as claimed in claim 1, further comprising diluting and aerating the second alkaline solution before precipitating the elemental selenium.

10. The method as claimed in claim 1, further comprising evaporating the second alkaline solution to concentrate the alkali in the solution for recovery.

11. The method as claimed in claim 1, wherein, the heating the second alkaline solution to a predetermined second temperature includes heating the second alkaline solution to a predetermined initial temperature and then heating the second alkaline solution to the predetermined second temperature, the predetermined second temperature being higher than the predetermined initial temperature.

* * * * *